Patented Mar. 6, 1951

2,544,308

UNITED STATES PATENT OFFICE 2,544,308

REFINING OF ORGANIC COMPOUNDS

Louis D. Friedman and William B. Hughes, Barnsdall, Okla., assignors to Cities Service Oil Company, Bartlesville, Okla., a corporation of Delaware No Drawing. Application July 3, 1946, Serial No. 681,420

16 Claims. (Cl. 260—450)

This invention relates to the refining of organic compounds, and more particularly, to the treatment of alcohols for the purpose of removing carbonyl impurities of the type which give positive tests with hydroxylamine hydrochloride.

The principal source of commercial alcohols, and particularly the lower alkyl alcohols containing from one to four carbon atoms, lies in the several processes of synthesis which have been developed within the past few years. It is characteristic of these products that they contain carbonyl impurities of an aldehydic or ketonic nature which are particularly difficult to remove, and the presence of which renders the products incapable of meeting the rigid specifications prescribed by the American Chemical Society and the U. S. Pharmacopoeia for alcohols. The hydrocarbon oxidation process, especially in its adaptation to the treatment of natural and refinery gases, yields methanol and other alcohols of high potential value. It is of note, however, that the full value of these synthesized alcohols has not heretofore been realized because of the lack of a practical method of stripping out enough carbonyl impurities to comply with chemically pure specifications. The modified Fischer-Tropsch synthesis (Synthol process) is another source of a large group of alcohols of high intrinsic value. These "Synthol" products are, however, so rich in carbonyl impurities, and are so exceedingly difficult to purify even to the point where they may be employed for general industrial utility, as to have had little commercial value in the past. Similarly, the products of other alcohol synthesis processes are generally found to be contaminated with a greater or lesser quantity of carbonyl impurities which disqualify them as chemically pure products.

It is a matter of common knowledge in the art that the treatment of impure alcohols with a caustic solution will result in the condensation of such aldehydic impurities as are normally present, and permit of the recovery of a partially purified product. An operation of this kind is highly undesirable in its high consumption of chemicals, in its loss of difficultly recoverable alcohols, and particularly in the fact that the finished product still contains carbonyl compounds and other impurities to such an extent as to render it unfit for pharmaceutical, biological, and comparable uses. It has also been suggested that carbonyl containing alcohols be treated with activated carbon for the purpose of absorbing the impurities, but this operation has proven so expensive both in its consumption of carbon and of the alcohols as to be impracticable. A number of solvent treating and distillation techniques have been disclosed as means for stripping carbonyl impurities from the lower alcohols but all have proven to be impracticable on the ground of expense and general ineffectiveness. The prior art may therefore be summed up in this fashion: known processes are expensive to carry out and are generally ineffectual in their results. None has been available for the commercial treatment of synthesized alcohols to fit them for use as chemically pure products. All of these materials have accordingly been relegated to the less exacting uneconomic and other uses and they have therefore commanded only the lowest of prices.

The principal object of the present invention is to provide a method for removing carbonyl impurities from organic compounds, and more especially for the purification of alcohols, which method is more effective in its results and less expensive to carry out than anything known in the prior art.

It is a further object of the invention to provide a simple and inexpensive process for reducing the carbonyl content of an aliphatic alcohol, and which is therefore particularly applicable to the purification of synthesized alcohols for the purpose of up-grading these products to the point where they will meet the various specifications laid down for chemically pure products.

It is yet another object of the invention to provide a process for treating alcohols in such a way as to convert their carbonyl impurities into relatively non-volatile organic complexes, and accordingly to permit of the recovery of a highly purified alcohol on the one hand and of valuable organo-hydroxy-substituted products on the other.

Other objects and various features of our invention will be brought out and more fully developed in the following description of our process and in the several examples of its use.

Broadly stated our invention resides in the treatment of organic compositions containing carbonyl impurities with an added carbonyl condensing agent to convert the carbonyl impurities into relatively non-volatile organic complexes from which the principal composition may readily be separated. More specifically, we have discovered that the treatment of an organic composition such as an alcohol, ester, or hydrocarbon containing aldehydic or ketonic impurities, with added carbonyl condensing agent such as aldehydes or ketones, in the presence of a basic condensation catalyst, results in the conversion of substantially all the carbonyl compounds into complexes of higher molecular weight and lower volatility, and accordingly allows of the recovery of a highly purified product, on the one hand, and of valuable hydroxy byproducts on the other. We have further found that the foregoing condensation reaction is particularly applicable to the purification of synthesized alcohols and hydrocarbons such as those obtained from hydrocarbon oxidation, from the Synthol Fischer-Tropsch process, and from other well known syntheses.

In carrying out the purification process in accordance with the foregoing we preferably add a sufficient quantity of the selected condensing agent to the impure product under treatment to result in the condensation of a substantial portion of its contained carbonyl impurities, and we then separate the principal product from the resulting organic complexes by simple distillation. We have found that formaldehyde, benzaldehyde, furfuraldehyde and acetaldehyde are all active in effecting carbonyl condensation, and that other alkyl, aralkyl, and heteroalkyl aldehydes are also satisfactory for this purpose. Conversely, where the impurity being removed is of an essentially aldehydic nature, a ketone such as acetone, methyl-ethyl ketone, aceto-phenone, benzo-phenone and the like may be employed to effect the desired condensation reaction. It is of further note that the amount of condensing agent which is added to the product under treatment may be varied within wide limits. We have been able, for example, to reduce the carbonyl impurities in a synthesized methanol solution to a very low value, but not to the point of complete cleanup, by treating it with formaldehyde in a molar ratio to the carbonyl impurities of as little as 0.5:1. In general, however, we find it better to employ at least one mol of aldehyde condensing agent per mol of carbonyl impurity, and we prefer both for ease of reaction and for the promotion of more valuable condensation products to use a still higher condensing ratio, ranging from about 2:1 up to as much as 6:1. Thus we find that the use of the higher concentrations of condensing agent results in a more effective cleanup as well as in the formation of organic complexes of a syrupy nature which have considerable utility as hydroxy syrups or which can be modified from the lower hydroxy content to a more desirable higher hydroxy final product.

It is a matter of considerable note that the condensing agent may be added to the product under treatment in dilute or concentrated solution or even in the form of a polymer in some cases, thus allowing for very considerable latitude in carrying out the process in a manner which may be most desirable or economical in any given instance. We have, for example, obtained highly satisfactory results in cleaning up alcohol solutions by the use of waste formaldehyde streams containing as little as four per cent of formaldehyde. On the other hand, concentrated solutions such as formalin or even formaldehyde polymers in essentially anhydrous condition have proven effective in carrying out our process, and are in fact to be preferred where anhydrous alcohols are the subjects of purification.

As briefly indicated above, the process is preferably carried out in the presence of a basic condensation catalyst. The alkali metal and alkaline earth metal carbonates, bicarbonates, oxides and hydroxides, and other metallic bases such as the metallo-organic bases, all have a basic catalytic action in promoting the desired carbonyl condensation. In carrying out the process with formaldehyde, for example, we prefer the alkaline earth oxides and hydroxides because these milder alkalies do not promote formaldehyde auto-condensation to the same extent as do the alkali metal hydroxides. We have further found that this reaction should be carried out at a pH value below 14, and that when the alkali metal hydroxides are used the pH must be kept below 12, in order to avoid formaldehyde condensation. In using acetaldehyde, benzaldehyde, and other higher aldehydes which are not so prone to auto-condensation, we have been able to effect carbonyl removal without difficulty at a pH value above 12 and even above 14 in the presence of a catalyst of either the alkali metal or alkaline earth metal types.

In carrying out the reaction, the catalyst may be added as a single charge at the start of the treatment. We generally prefer, however, to make repeated additions of small amounts of the basic condensing agent throughout the course of the reaction and in such a quantity as to maintain the pH at a value between 9 and 14+, depending upon the particular carbonyl condensing agent employed. Under these conditions the reaction proceeds efficiently, and in a regularly reproducible manner, to give a hydroxy-substituted product in which the carbonyl impurities are combined and a purified principal product which may readily be separated out.

The process appears to be one of general utility in the refining of alcohols, and has proven particularly useful in the purification of the lower aliphatic member of this group. We have, for example, applied it with success to the purification of synthetic methanol obtained from hydrocarbon oxidation, reducing the carbonyl content of that product from an initial value of as much as five per cent down to a final value of no more than a trace. The upgrading of this alcohol to meet chemically pure specifications, obviously increased its market value to a very appreciable extent. It is of note that the treatment was carried out with waste formaldehyde streams so that its cost was low, that there was no substantial loss of valuable product, and that the carbonyl impurities were recovered in the form of a hydroxy syrup which itself has some considerable utility and economic value. In a number of other cases the process has been applied to the purification of Synthol alcohols, and to various kinds of alcohols derived from other sources, again at a low cost and with minimum product loss.

It is particularly worth noting that the alcohols mentioned above do not require special treatment in preparation for purification by our new method. Thus synthetic alcohols, and particularly those obtained from the Synthol process, are frequently recovered in aqueous solution, and may be treated directly by our process without special preparation. On the other hand, we find that anhydrous alcohols may readily be purified in that form, without preliminary dilution and accordingly without final reconcentration. It follows therefore that our purification treatment may be incorporated in an alcohol production process at the point where it fits best and where it may be carried out most easily and economically.

We have described our invention at some length in its application to the purification of alcohols because of its particular utility in upgrading synthesized products of this kind. It is to be understood, however, that the invention is not so limited. Thus we have found it to be fully applicable to the cleaning up of carbonyl impurities in hydrocarbons, and it appears to have utility in the refining of ethers, esters, acetals and still other classes of compounds. In addition, of course, it is a means of producing hydroxy-substituted condensation products which are of considerable utility, both in and of themselves and as starting products for the preparation of other materials. The wide range of uses to which the invention can be put and the diversity of conditions under which it may be successfully carried out, are illustrated in part by the following examples:

EXAMPLE I (A) To a 100 gram sample of anhydrous methanol containing 2.2 per cent by weight of methyl ethyl ketone, were added 3.7 grams of paraformaldehyde and 0.27 gram of anhydrous potassium carbonate. A three ml. sample of this mixture was titrated with $1N.H_2SO_4$ to its neutral point with rosalic acid indicator. Fifteen ml. of a saturated solution of sodium sulfite were added and the whole titrated back to the neutral point with normal sulfuric acid. The formaldehyde content was roughly equivalent to the titer of the acid used. The mixture was then refluxed gently, determining the base and formaldehyde content at half hour intervals until the formaldehyde had disappeared, an operation requiring 80 minutes. The flask was then attached to a fractionating column, and the alcohol was removed by distillation. The distillate was tested for carbonyl content in a qualitative way by adding a few drops of the distillate to a saturated solution of 2,4-dinitrophenylhydrazine in 2N.HCl. A precipitate is a positive test, while our treated sample gave no precipitate and was essentially carbonyl-free.

The carbonyls were determined quantitatively by a modification of the method of Brochet and Chambier (Z. Anal. Chem. 34:623 (1895)) which involves the following procedure:

Two 5 ml. portions of a 10 per cent hydroxylamine hydrochloride solution which has previously been neutralized to a bromphenol blue end point are added to a 125 ml. Erlenmeyer flask containing about 5 grams of accurately weighed alcohol. After about 5 minutes this is titrated with 0.1N.KOH to a change from yellow to purple.

$$\frac{\text{Titer} \times N. \text{ of KOH} \times 7.2}{\text{Sample weight}} = \text{Per cent carbonyl as methyl ethyl ketone}$$

The above synthetic mixture of ketone in C. P. methanol was practically freed of all carbonyl compounds by the treatment. The carbonyl content was reduced on treatment from an initial value of 2.2 wt. per cent to an average value of 0.2 wt. per cent demonstrating that over 99 per cent of the carbonyl compounds are removed.

We have carried the purification still further by refluxing the treated alcohol with 20 per cent by volume of a 5 normal caustic solution for an hour then refractionating the alcohols. If caustic treatment is to be employed, however, we prefer as a matter of convenience and economy to carry it out before the initial fractionation.

(B) To a 100 gram sample of anhydrous methanol containing 2.2 per cent by weight methyl ethyl ketone, were added 5.5 grams of paraformaldehyde and 0.24 gram of anhydrous calcium hydroxide. A sample of this material was titrated to determine the base and formaldehyde present by the method described in the preceding example. The mixture was then held at a temperature of 50–55° C. with mechanical stirring. Samples were taken at half hour intervals and any drop in base was offset by the addition of calcium hydroxide. At the end of eight hours the reaction was complete, as was evidenced by the disappearance of formaldehyde, the alcohol was fractionated from the mixture, treated with 20 per cent by volume of 5 N. caustic for an hour at reflux temperature, and a substantially carbonyl-free product was then recovered by refractionation.

(C) To a 100 gram sample of methanol containing 15 per cent by weight water and 3.1 per cent by weight methyl ethyl ketone, were added 7.6 grams of paraformaldehyde and 7.2 grams of anhydrous potassium carbonate. The base and formaldehyde were determined in the mixture as was described in Example I. The mixture was then refluxed for 1½ hours, taking samples for analysis every half hour. The reaction was complete at the end of this time as shown by the disappearance of the formaldehyde. The mixture was accordingly treated with 20 per cent by volume of 5 N. caustic, and a highly purified alcohol was recovered by fractionation.

(D) To a 100 gram sample of methanol containing 15 per cent of water and 2.2 per cent by weight of methyl ethyl ketone 7.6 grams of paraformaldehyde were added and 0.24 gram of dry calcium hydroxide. A sample of this material was titrated as described above to determine the base and formaldehyde present. The reaction mixture was held at a temperature of 50–55° C. while being mechanically stirred. Samples were taken at half hour intervals and any drop in base was offset by addition of calcium hydroxide. The reaction mass was thus maintained in a pH range of 11 to 12. After eight hours at the indicated temperature the reaction was complete, as was evidenced by the disappearance of formaldehyde by the standard sodium sulphite test. The sample thus treated was substantially free of carbonyl compounds.

(E) To a 100 gram sample of methanol containing 58 per cent by weight water and 2.2 per cent by weight methyl ethyl ketone 3.7 grams of paraformaldehyde and 0.27 gram of anhydrous potassium carbonate were added. The base and formaldehyde were then determined by the method previously described. The mixture was then refluxed, with samples being taken at half hour intervals, at a maintained pH of above 14. At the end of about one and one-half hours, all of the formaldehyde had disappeared, indicating that the condensation reaction was complete. The alcohol was fractionated from the mixture after treatment with 20 per cent by volume of 5 N. sodium hydroxide for an hour at reflux temperatures, and was found to be substantially carbonyl-free.

(F) To a 100 gram sample of methanol containing 58 per cent by weight water and 2.2% by weight methyl ethyl ketone 5.5 grams of paraformaldehyde and 0.24 gram of anhydrous calcium hydroxide were added and the temperature was held at 50–55° C. for eight hours with samples being taken at the start and at half-hour intervals to measure the formaldehyde disappearance. During the eight hour reaction period the solution was maintained at a basic pH value of 11 to 12.

At the end of this time the sample was treated with 20 per cent by volume of 5 N. sodium hydroxide, and a highly purified alcohol recovered by fractionation.

In the foregoing we have demonstrated the applicability of our process to the purification of a series of methanol solutions containing various amounts of methyl-ethyl-ketone. The results of these several runs with varying amounts of water present, at various condensing agent-carbonyl impurity ratios, with different reaction times and temperatures, and under varying basic pH conditions as controlled by the addition of different basic catalytic agents, are set forth below in Table I. It is particularly of note that the treatment of these contaminated products in accordance with our method in each instance resulted in the practically quantitative removal of the carbonyl impurities and in the recovery of a chemically pure alcohol.

*Table I*

THE PURIFICATION OF ALCOHOLS BY HYDROXYMETHYLATION

| Run No. | Weight Per Cent Ketone | Weight Per Cent Water | Mol Ratio, HCHO/R₂CO | Time, Hrs. | Temp., °C. | Catalyst | pH | Weight Per Cent Carbonyls in the treated alcohols | | | |
|---|---|---|---|---|---|---|---|---|---|---|---|
| | | | | | | | | 1st 25% | 2nd 25% | 3rd 25% | 4th 25% |
| A | 2.2 | 0 | 4:1 | 1.5 | 83 | K₂CO₃ | Above 14 | .02 | .01 | .01 | .04 |
| B | 2.2 | 0 | 6:1 | 8 | 50-55 | Ca(OH)₂ | 11-12 | .03 | .01 | .02 | .01 |
| C | 3.1 | 15 | 6:1 | 1.5 | 83 | K₂CO₃ | Above 14 | .05 | .01 | .01 | .01 |
| D | 2.2 | 15 | 6:1 | 8 | 50-55 | Ca(OH)₂ | 11-12 | .02 | .03 | .01 | .04 |
| E | 2.2 | 58 | 4:1 | 1.5 | Reflux | K₂CO₃ | Above 14 | .01 | .04 | .01 | .04 |
| F | 2.2 | 58 | 6:1 | 8 | 50-55 | Ca(OH)₂ | 11-12 | .01 | .01 | .02 | .01 |

EXAMPLE II

The foregoing example deals with the purification of an alcohol containing a single impurity of the carbonyl type. The method is equally applicable, however, to the purification of products containing mixed carbonyls. Thus we have applied it with complete success to the treatment of a number of samples of methanol containing various amounts of a mixture consisting of 50 per cent methyl-ethyl-ketone, 25 per cent diethyl ketone and 25 per cent di-isopropyl ketone. The results of these several runs using formaldehyde as a condensing agent are shown in Table II, wherein both the original and final carbonyl content was calculated as methyl-ethyl ketone.

cation of commercially available alcohols containing carbonyl impurities as natural concomitants of the method of manufacture, is illustrated below. In each of these cases the product under treatment was a fraction obtained from the distillation of the dilute aqueous products of the Fischer-Tropsch reaction (Synthol modification) between 75° and 99° C. It is of note that this fraction included about seventy parts ethanol, twenty parts propanol, ten parts butanol and two parts of higher essentially normal aliphatic alcohols, and that it was contaminated with methyl normal propyl ketone diethyl ketone, methyl-ethyl-ketone, valeraldehyde, and traces of carbonyl impurities which have not been specifically identified. These Synthol alcohols were chosen for purposes of illustration because of their great resistance to purification by any known method.

(A) To 600 grams of the foregoing Synthol fraction containing 4.1 per cent by weight of the carbonyl impurities mentioned above but for convenience calculated as methyl-ethyl-ketone, cov-

*Table II*

| Ketone, Weight Per Cent | Water, Per Cent | Mol Ratio, HCHO/R₂CO | Time, Hrs. | Temp. °C. | Catalyst | pH | Weight Per Cent Carbonyls over [1] | | | |
|---|---|---|---|---|---|---|---|---|---|---|
| | | | | | | | 1st 25% | 2nd 25% | 3rd 25% | 4th 25% |
| 2.2 | 15 | 6:1 | 8 | 25-45 | Ca(OH)₂ | 11-12 | Tr | Tr | Tr | Tr |
| 2.2 | 15 | 6:1 | 8 | 50-55 | do | 11-12 | Tr | Tr | Tr | Tr |
| 2.2 | 58 | 6:1 | 8 | 40-45 | do | 11-12 | Tr | Tr | Tr | Tr |
| 2.2 | 58 | 6:1 | 1.5 | Reflux | K₂CO₃ | above 14 | Tr | Tr | Tr | Tr |
| 2.2 | 58 | 9:1 | 8 | 50-55 | Ca(OH)₂ | 11-12 | Tr | Tr | Tr | Tr |
| 2.2 | 0 | 4:1 | 1.5 | Reflux | K₂CO₃ | above 14 | Tr | Tr | Tr | Tr |
| 2.2 | 0 | 6:1 | 8 | 50-55 | Ca(OH)₂ | 11-12 | Tr | Tr | Tr | Tr |
| 2.2 | 15 | 4:1 | 1.5 | Reflux | K₂CO₃ | above 14 | Tr | Tr | Tr | Tr |
| 2.2 | 15 | 2:1 | 1.5 | do | do | above 14 | 0.1 | Tr | 0.1 | 0.3 |
| 2.2 | 15 | 6:1 | 8 | 50-55 | Ca(OH)₂ | 11-12 | Tr | Tr | Tr | Tr |
| 2.2 | [2] 15 | 6:1 | 8 | 50-55 | do | 11-12 | Tr | Tr | Tr | Tr |
| 1.4 | 15 | 2:1 | 8 | 50-55 | do | 11-12 | 0.4 | 0.5 | 0.1 | Tr |
| 1.4 | 15 | 3:1 | 8 | 50-55 | do | 11-12 | 0.3 | Tr | Tr | Tr |
| 1.4 | 15 | 2:1 | 4 | Reflux | NaOH | 9-10 | 0.1 | 0.2 | Tr | Tr |
| 1.4 | 15 | 3:1 | 1.5 | do | K₂CO₃ | above 14 | Tr | Tr | Tr | Tr |
| 1.4 | 15 | 4:1 | 8 | 50-55 | Ca(OH)₂ | 11-12 | Tr | Tr | Tr | Tr |
| 1.4 | 15 | 6:1 | 1.5 | Reflux | NaOH | 9-10 | Tr | Tr | Tr | Tr |
| 3.7 | 15 | 2:1 | 4.5 | do | do | 9-10 | Tr | Tr | Tr | Tr |
| 3.7 | 15 | 3:1 | 4.5 | do | do | 9-10 | 1.4 | Tr | Tr | 1.0 |
| 3.7 | 15 | 4:1 | 4.5 | do | do | 9-10 | Tr | Tr | Tr | Tr |
| 3.7 | 15 | 4:1 | 4.5 | do | do | 9-10 | Tr | Tr | Tr | Tr |
| 3.7 | 15 | 4:1 | 8 | 50-55 | do | 9-10 | Tr | Tr | Tr | Tr |
| 2.1 | | 1:2 | 24 | Reflux | do | 9:0 | 0.9 Overall | | | |
| 1.2 | | 1:2 | 16 | do | do | 11.5 | 0.13 Overall | | | |
| 2.1 | | 1:1 | 14 | do | do | 8.5 | 0.2 Overall | | | |
| 2.1 | | 1:1 | 11 | do | do | 10.0 | 0.2 Overall | | | |
| 2.1 | | 1:1 | 2 | do | do | 11.5 | 0.2 Overall | | | |
| 1.2 | | 1:1 | 4.5 | do | Ca(OH)₂ | 12.0 | 0.13 Overall | | | |
| 1.2 | | 2:1 | 2.5 | do | do | 12.0 | 0.17 Overall | | | |
| 1.2 | | 1:6 | 48 | do | do | 8.4 | 0.70 Overall | | | |

[1] Trace values = less than 0.05% carbonyl calculated as methyl ethyl ketone.
[2] Includes water present in U. S. P. Formalin which was used.

EXAMPLE III

The application of our method to the purification of commercially available alcohols containing a boiling range of 70.3-99° C. were added to 10.3 grams of paraformaldehyde and 4.5 grams of anhydrous calcium hydroxide. A sample was titrated to determine the initial base and formaldehyde content. The mixture was then held at 50–55° C. until all the formaldehyde had disappeared, an operation requiring two and one-half hours. During the reaction a slight darkening was observed in the mixture. The solution was then neutralized by using the stoichiometric quantity of sulphuric acid. The alcohols were stripped from the water mixture after filtration, treated at reflux temperature with 20 volume per cent of 5 N. sodium hydroxide and fractionated from the basic solution into ten cuts as follows:

| Cut No. | B. Range, °C. | Weight Per Cent Carbonyl as Methyl Ethyl Ketone |
|---|---|---|
| 1 | 72.9–76.9 | less than 0.05 |
| 2 | 76.9–78.0 | less than 0.05 |
| 3 | 78.0–79.0 | less than 0.05 |
| 4 | 79.0–80.0 | less than 0.05 |
| 5 | 80.0–82.0 | less than 0.05 |
| 6 | 82.0–84.0 | less than 0.05 |
| 7 | 84.0–87.5 | less than 0.05 |
| 8 | 87.5–88.5 | less than 0.05 |
| 9 | 88.5–92.9 | less than 0.05 |
| 10 | 92.9–99.0 | less than 0.05 |

The stripped water solution was concentrated to a dark viscous syrup which contained 4.9 per cent by weight of water as analyzed by the Karl Fischer reagent of Smith, Bryant, and Mitchell (J. A. C. S. 61: 2407, 1939) and 19.3% of hydroxy determined by acetylation with acetic anhydride in pyridine and determining the excess acetic acid.

(B) To 400 grams of the Synthol alcohol fraction were added 6.8 grams of paraformaldehyde and 16 cc. of 1 N. sodium hydroxide. After an initial titer was taken the mixture was refluxed for 6 hours then allowed to stand over night at which time only 64.3% of the original formaldehyde had disappeared. The alcohols were stripped and fractionated after caustic treatment, into the following cuts:

| Cut No. | B. Range °C. | Weight Per Cent Carbonyl as Methyl Ethyl Ketone |
|---|---|---|
| 1 | 69.0–76.0 | 1.2 |
| 2 | 76.0–78.0 | 0.2 |
| 3 | 78.0–79.0 | 0.05 |
| 4 | 79.0–81.0 | less than 0.05 |
| 5 | 81.0–86.0 | less than 0.05 |
| 6 | 86.0–88.0 | less than 0.05 |
| 7 | 88.0–89.0 | less than 0.05 |
| 8 | 92.0–93.0 | less than 0.05 |
| 9 | 93.0–99.0 | less than 0.05 |

The stripped water was vacuum concentrated to a clear yellow liquid containing 14.3% (wt.) of water as determined by the Karl Fischer reagent, and 15.7% (wt.) hydroxyl on a dry basis. Further concentration of this material produced a white, hygroscopic crystalline material having interesting properties as a hydroxymethylation product.

The method was applied to the purification of additional samples of the Synthol alcohols containing varying amounts of carbonyl impurities, with formaldehyde as the condensing agent. The results of these runs are shown below:

*Table III*

| Initial Carbonyl, Weight Per Cent | Water, Per Cent | Mol Ratio, HCHO/R$_2$CO | Time, Hrs. | Temp., °C. | Catalyst | pH | Final Carbonyl, Weight Per Cent | | | |
|---|---|---|---|---|---|---|---|---|---|---|
| | | | | | | | 1st 25% | 2nd 25% | 3rd 25% | 4th 25% |
| 1.7 | 5 | 9:1 | 48 | 25–45 | Ca(OH)$_2$ | 11–12 | 0.3 | 0.2 | 0.1 | 0.1 |
| 3.3 | 15 | 9:1 | 1.5 | Reflux | K$_2$CO$_3$ | above 14 | 0.2 | Tr | Tr | Tr |
| 1.7 | 5 | 9:1 | 1.5 | ----do---- | K$_2$CO$_3$ | above 14 | 0.2 | Tr | Tr | Tr |
| 1.7 | 5 | 9:1 | 48 | ----do---- | Ca(OH)$_2$ | 11–12 | Tr | Tr | Tr | Tr |

Note: Trace values = less than 0.05% carbonyl calculated as methyl-ethyl-ketone.

EXAMPLE IV

Our new method has also been employed for the purification of crude methanol produced by the partial oxidation of such gases as natural gas, and stabilizer and cracked gases obtained from petroleum refinery operations. It is of particular note that this alcohol frequently contains no more than about 0.1% of carbonyl impurities, but gives a very pronounced darkening in the well known sulphuric acid test, and is particularly resistant to purification by any heretofore known method. Upon treatment with formaldehyde in accordance with our process, we have been able to remove substantially all of the impurities which give a positive sulphuric acid test, although not all of the carbonyl impurities. The results of two such runs are shown below. By the judicious selection of the condensing agent, the ratio in which it is employed, the catalyst, the pH value and other reaction conditions, an alcohol of this kind may be purified to the point of reducing its carbonyl content to substantially trace value while simultaneously removing most of the impurities which give a positive sulphuric acid test.

*Table IV*

| Initial Carbonyl, Weight | Water, Per Cent | Mol Ratio, HCHO/R$_2$CO | Time, Hrs. | Temp. °C. | Catalyst | pH | Final Carbonyl, Weight Per Cent | | | |
|---|---|---|---|---|---|---|---|---|---|---|
| | | | | | | | 1st 25% | 2nd 25% | 3rd 25% | 4th 25% |
| 0.1 | 15 | 6:1 | 2.5 | Reflux | NaOH | 10.11 | .08 | 0.1 | .09 | .09 |
| 0.1 | 15 | 6:1 | 9 | 50–55 | ----do---- | 10.11 | 0.1 | 0.1 | .05 | tr |

Trace values = less than 0.05% carbonyl calculated as methyl-ethyl-ketone.

EXAMPLE V

In the foregoing we have considered only formaldehyde in aqueous solutions of various concentrations, and in the form of an anhydrous polymer, as a condensing agent for carbonyl impurities in alcoholic solutions. We have found that other alkyl, aralkyl, and heteroalkyl aldehydes are also effective for this purpose. The use of several such condensing agents in removing a mixture of ketones from methanol is illustrated below. In the first seven of these runs the product under treatment was methanol containing from about one to two per cent of a mixture of 50% methyl-ethyl-ketone, 25% diethyl ketone, and 25% di-isopropyl ketone. The last run, however, applies to the purification of the Synthol alcohol fraction described in Example III.

*Table V*

| Alcohol | Condensing Agent | Mol Ratio, RCHO/Carbonyl | Time, Hrs. | Temp. | pH | Catalyst | Carbonyl Content [1] | |
|---|---|---|---|---|---|---|---|---|
| | | | | | | | Initial | Final |
| Methyl | Benzaldehyde | 2:1 | 11.5 | Reflux | 11.5 | NaOH | 1.2 | .05 |
| Do | do | 1:1 | 4 | do | 14+ | do | 1.2 | .05 |
| Do | do | 1:1 | 10 | do | 9.0 | do | 2.1 | .05 |
| Do | Furfural | 1:1 | 7 | do | 11.5 | do | 1.2 | .12 |
| Do | Acetaldehyde | 1:1 | 8.5 | do | 11.5 | do | 1.2 | .23 |
| Do | do | 1:1 | 2 | do | 14+ | do | 1.2 | .20 |
| Do | do | 2:1 | 6 | do | 11.5 | do | 1.2 | .20 |
| Synthol | do | 4:1 | 42 | do | 8.5 | do | 1.45 | [2] .05 |

[1] Calculated as methyl-ethyl ketone.
[2] Residual acetaldehyde unused. Final carbonyl by difference.

A comparison of these data with that of the preceding examples, and particularly Example II, indicates that formaldehyde is the most reactive of the several aldehydic condensing agents, that benzaldehyde is also capable of reducing the carbonyl impurities in alcoholic solutions to trace value, and that the other aldehydes are somewhat less effective. It is of note, however, that the formaldehyde condensation reaction must be carried out at a pH value below 14, and preferably below 12 with alkali hydroxide catalysts, in order to avoid auto-condensation in preference to the condensation with the carbonyl impurities. The other aldehydes are not so prone to self-reaction, and may accordingly be used in carrying out our process at higher pH values, without loss, and with correspondingly lessened reaction time.

We have also found that the organic complex which results from the condensation of carbonyl impurities with formaldehyde may itself be used as a condensing agent. Thus we have successfully employed the hydroxymethylated product which was separated from the purified alcohol in runs 22–27 of Table II, as the condensation agent in treating a sample of the impure methanol described above. The data concerning one such run is shown below:

| Product | Initial Carbonyl Content | Mol Ratio, Agent/Carbonyl | Time, Hrs. | Temp. | pH | Catalyst | Final Carbonyl Content |
|---|---|---|---|---|---|---|---|
| Methanol | 1.2 | 1:0 | 36 | Reflux | 12–12.5 | Ca(OH)$_2$ | 0.10 |

It will be evident that while complete cleanup was not obtained in this case, carbonyl impurities were reduced to a very material extent. We find it feasible, however, to carry out the process in what amounts to two stages, arranged in countercurrent, using the organic complex as a condensing agent for the fresh feed streams of impure alcohol and finishing the purification with added formaldehyde. This, of course, means that a lesser total quantity of formaldehyde need be employed so that the overall process may be carried out at a correspondingly lessened cost. At the same time, of couse, the hydroxy methylation product obtained from the final cleanup with fresh formaldehyde is not lost, but is recovered at the end of the first stage of the purification for suitable disposal.

In those cases in which the alcoholic impurity is essentially aldehydic in character, we find it possible to use the ketones as condensation agents. Thus propanol containing 2.5 wt. percent of formaldehyde was treated with 1.2 wt. percent of acetone corresponding to a ratio of one mol of added ketone per four mols of aldehyde impurity, in the presence of sodium hydroxide as a basic condensation catalyst at reflux temperature with the pH of the reacting solution held at 9.0. At the end of five and one-half hours the reaction appeared complete, and a highly purified propanol was recovered by distillation. In this instance the treatment resulted in the reduction of the formaldehyde impurity to a final value of about 0.05%.

Other lower aliphatic alcohols containing aldehydic impurities may be cleaned up by the addition of a ketone in the same general way. It is of further note that we are not limited to the use of acetone for this specific purpose, for we have found that methyl-ethyl-ketone, acetophenone, and other similar ketones are effective condensing agents.

EXAMPLE VI

The foregoing examples demonstrate the general practicability of the process to the cleaning up of alcohols, and particularly the lower aliphatic members of this group. The process is, however, of much broader utility than these cases would indicate, being generally applicable to the removal of carbonyl impurities from higher alcohols, hydrocarbons, ethers, esters, acetals, and the like, and particularly compounds of this kind which are not reactive with the added carbonyl condensing agent. Specific examples of the purification of hydrocarbons and esters follow:

Normal heptane containing a mixture of methyl-ethyl-ketone, diethyl ketone and di-isopropyl ketone was treated with paraformaldehyde dissolved in anhydrous methanol, in such quantity as to give a 4:1 ratio of added carbonyl compound per mol or carbonyl impurity present. A one normal solution of sodium methylate in methanol was used as the basic catalyst condensing agent. In carrying out the reaction we made repeated additions of this basic solution to the hydrocarbon-formaldehyde reaction system to maintain the pH of the reactants at 9. After four hours of heating and refluxing this two-phase system, the added aldehyde had disappeared, and the hydrocarbon was then recovered in a high state of purity. It is of note that this treatment resulted in the reduction of the carbonyl content of the n.heptane from an initial value of 2.7% to a final value of 0.05%, the carbonyl being computed for convenience as methyl-ethyl ketone.

To a solution of butyl acetate containing 2.0% of the mixed ketones calculated as methyl-ethyl-ketone, we added formaldehyde in the form of its essentially anhydrous polymer, paraformaldehyde, in a quantity sufficient to introduce one mol of carbonyl compound per mol of impurity present. With an excess of solid calcium hydroxide present as a basic condensation catalyst to maintain the pH of the reactants at 12 to 12.5, the mixture was refluxed for five hours at the end of which time the added formaldehyde had disappeared. The ester which was recovered contained only a trace of carbonyl equivalent to 0.05% or less, calculated as methyl-ethyl-ketone.

The new purification process is in effect a condensation of the aldehydes and ketones in solution in an alcohol or other organic compound which is not essentially reactive with carbonyl condensing agents, to form an organo-substituted hydroxy complex which may readily be separated out. It is not limited, however, to the condensation of the particular ketones and aldehydes which have been mentioned in the foregoing examples, nor to the removal of carbonyl impurities which are present in the specific ratios of ketones to aldehydes there shown. On the contrary, we have found it possible to effect material reduction of carbonyl impurities of so wide a range of types and ratios from so wide a variety of alcohols and other compounds as to make it appear that the method is one of general application. In fact, we find that the carbonyl impurities normally present in the several compounds which have been specifically mentioned, are generally reducible to trace values by the judicious selection of the condensing agent or agents employed, of the ratio of condensing agent with respect to carbonyl impurities of the catalyst, and of the pH value at which the reaction is carried out, all within the general limits hereinbefore set forth. It is of special note that methanol obtained from gaseous hydrocarbon oxidation, and methanol, ethanol, propanol, and butanol obtained from Fischer-Tropsch synthesis (Synthol modification), and the higher alcohols of both of these processes ranging up to amyl, hexyl and even higher, may be upgraded by our purification process to the point where they may be used for biologicals, cosmetics and for similar purposes.

It will be appreciated that the foregoing process does not necessarily exclude the use of complementary purification treatments of a conventional nature. On the contrary, our process may be used for cleaning up residual carbonyl impurities in an alcohol or other compound which has been subjected to partial purification by other means. Again we may employ the new process as the sole means for removing carbonyl impurities, and may supplement it with other chemical and physical treatments for abstracting impurities of other kinds. In fact, our carbonyl condensation method may be used to complement substantially any well known purification process, provided only that the treatments which follow its application, do not result in the reintroduction of the undesired carbonyl compounds.

The hydroxymethylated condensation product which is obtained from the treating of alcohols with formaldehyde in accordance with our invention appears to be a new composition of matter in that it is obtained in the form of a syrup which is rich in crystalline material. The whole syrup is hygroscopic, contrary to the nature of the typical hydroxymethylated products obtained from formaldehyde-ketone condensations. Upon separation of the crystalline material by selective solvent action, we obtained from the Synthol alcohol purification product a highly hygroscopic light crystalline product having possibly as much as 50 per cent of hydroxyl which appears to be abnormal in its nature and not typical of the crystalline material recoverable from the hydroxymethylated product obtained by direct reaction. As we have pointed out above, the hydroxymethylated condensation products obtained in the presence of high concentrations of methanol are in many ways individual in their properties in having reduced water solubility particularly. We have generally found that these syrupy condensation products have a varying hydroxy content roughly proportional to the molar ratio of formaldehyde used in the carbonyl impurity condensation reaction. When a high molar ratio of formaldehyde is used, the condensation products are generally of high hydroxy content and conversely, when a low molecular ratio of formaldehyde is used in the order of mol for mol, or up to four mols of formaldehyde the hydroxy content of the syrups tends to be low. By controlling the conditions of reaction we have been able to obtain an intermediate condensation product in which the formaldehyde-carbonyl reaction has not been carried to the point of syrup formation and when the alcohol is removed by distillation, preferably at reduced pressure to avoid excessive heat, the intermediate hydroxy product may be recovered and modified by reaction with additional aldehydes or ketone to produce the particular type of hydroxy syrup desired, or as the condition indicates, to develop a desired state of condensation and the preferred hydroxy content syrup.

Having described our invention in its broadest aspects and illustrated it by use of specific examples, what we claim as new is:

1. The process of removing carbonyl impurities of the group consisting of aldehydes and ketones from organic compositions which are not essentially reactive with basic condensing agents, which comprises treating an organic composition containing carbonyl impurities in proportions outside the range of from about 1 mol to about 9 mols of aldehyde to 1 mol of ketone, with an added carbonyl compound of such a nature as to balance the proportion of aldehyde to ketone within the said range, condensing the carbonyls in the presence of a basic condensing agent into an aldehyde-ketone condensation product which is less volatile than the principal compound, and separating the principal compound from such condensation product.

2. The process according to claim 1 in which the pH value of the reactants is maintained within the range of from about 8 to about 14.

3. The process of removing ketone impurities from organic compositions which are not essentially reactive with basic condensing agents, comprising treating such a composition containing carbonyl impurities consisting essentially of ketones with an aldehyde, in the proportions of from about 1 mol to about 9 mols of aldehyde to 1 mol of ketone, condensing the carbonyls in the presence of a basic condensing agent to form an organic complex which is less volatile than the principal compound, and separating the principal compound from such complex.

4. The process of removing ketone impurities from organic compositions which are not essentially reactive with basic condensing agents, which comprises the steps of treating such a composition containing carbonyl impurities consisting essentially of ketones with formaldehyde in the proportion of from about 1 mol to about 9 mols of formaldehyde to each mol of ketone, maintaining the pH value of the reactants within the range of from about 8 to about 14, condensing the formaldehyde and ketone impurities to form an organic complex including the impurities, which complex is less volatile than the principal compound, and separating the principal compound from such complex.

5. The process of removing aldehydic impurities from organic compositions not essentially reactive with carbonyl condensing agents, which comprises the steps of treating such a compound containing carbonyl impurities consisting essentially of aldehydes with an added ketone in the proportion of from about 1 mol to about 9 mols of aldehyde to each mol of ketone, in the presence of a basic condensing agent, to condense such impurities into an organic complex which is less volatile than the principal compound, and separating the principal compound from such complex.

6. The process of removing carbonyl impurities of the group consisting of aldehydes and ketones from alcohols, comprising the steps of treating an alcohol containing carbonyl impurities, in proportions outside the range of from about 1 mol to about 9 mols of aldehyde to 1 mol of ketone, with an added carbonyl compound of such a nature as to balance the proportions of aldehyde to ketone within the said range, condensing the carbonyls in the presence of a basic condensing agent into an aldehyde-ketone condensation product which is less volatile than the principal compound, and separating the principal compound from such condensation product.

7. The process of removing ketone impurities from alcohols, which comprises treating an alcohol containing carbonyl impurities consisting essentially of ketones with an aldehyde in the proportion of from about 1 mol to about 9 mols of aldehyde to 1 mol of ketone in the presence of a basic condensing agent, to form an aldehyde-ketone condensation product which is less volatile than the principal compound, and separating the principal compound from such condensation product.

8. The process of removing aldehydic impurities from alcohols, which comprises treating an alcohol containing carbonyl impurities consisting essentially of aldehydes with a ketone, in the proportion of from about 1 mol to about 9 mols of aldehyde to 1 mol of ketone, in the presence of a basic condensing agent, to form an aldehyde-ketone condensation product which is less volatile than the principal compound, and separating the principal compound from such condensation product.

9. The process of removing carbonyl impurities of the group consisting of aldehydes and ketones from organic compositions which are not essentially reactive with basic condensing agents, which comprises treating an organic composition containing carbonyl impurities in proportions outside the range of from about 2 mols to about 6 mols of aldehyde to 1 mol of ketone with an added carbonyl compound of such a nature as to balance the proportion of aldehyde to ketone within the said range, condensing the carbonyls in the presence of a basic condensing agent into an aldehyde-ketone condensation product which is less volatile than the principal compound, and separating the principal compound from such condensation product.

10. The process according to claim 9 in which the pH value of the reactants is maintained with the range of from about 8 to about 14.

11. The process of removing ketone impurities from organic compositions which are not essentially reactive with basic condensing agents, comprising treating such a composition containing carbonyl impurities consisting essentially of ketones with an aldehyde in the proportions of from about 2 mols to about 6 mols of aldehyde to 1 mol of ketone, condensing the carbonyls in the presence of a basic condensing agent to form an organic complex which is less volatile than the principal compound, and separating the principal compound from such complex.

12. The process of removing ketone impurities from organic compositions which are not essentially reactive with basic condensing agents, which comprises the steps of treating such a composition containing carbonyl impurities consisting essentially of ketones with formaldehyde in the proportion of from about 2 mols to about 6 mols of formaldehyde to each mol of ketone, maintaining the pH value of the reactants within the range of from about 8 to about 14, condensing the formaldehyde and ketone impurities to form an organic complex including the impurities, which complex is less volatile than the principal compound, and separating the principal compound from such complex.

13. The process of removing aldehydic impurities from organic compositions not essentially reactive with carbonyl condensing agents, which comprises the steps of treating such a compound containing carbonyl impurities consisting essentially of aldehydes with an added ketone in the proportion of from about 2 mols to about 6 mols of aldehyde to each mol of ketone, in the presence of a basic condensing agent, to condense such impurities into an organic complex which is less volatile than the principal compound, and separating the principal compound from such complex.

14. The process of removing carbonyl impurities of the group consisting of aldehydes and ketones from alcohols, comprising the steps of treating an alcohol containing carbonyl impurities, in proportions outside the range of from about 2 mols to about 6 mols of aldehyde to one mol of ketone, with an added carbonyl compound of such nature as to balance the proportions of aldehyde to ketone within the said range, condensing the carbonyls in the presence of a basic condensing agent into an aldehyde-ketone condensation product which is less volatile than the principal compound, and separating the principal compound from such condensation product.

15. The process of removing ketone impurities from alcohols, which comprises treating an alcohol containing carbonyl impurities consisting essentially of ketones with an aldehyde in the proportion of from about 2 mols to about 6 mols of aldehyde to 1 mol of ketone, in the presence of a basic condensing agent, to form an aldehyde-ketone condensation product which is less volatile than the principal compound, and separating the principal compound from such condensation product.

16. The process of removing aldehydic impurities from alcohols, which comprises treating an alcohol containing carbonyl impurities consisting essentially of aldehydes with a ketone in the proportion of from about 2 mols to about 6 mols of aldehyde to 1 mol of ketone, in the presence of a basic condensing agent, to form an aldehyde-ketone condensation product which is less volatile than the principal compound, and separating the principal compound from such condensation product.

LOUIS D. FRIEDMAN.
WILLIAM B. HUGHES.

REFERENCES CITED

The following references are of record in the file of this patent:

UNITED STATES PATENTS

| Number | Name | Date |
| --- | --- | --- |
| 1,684,640 | Schmidt et al. | Sept. 18, 1928 |
| 1,704,732 | Eisenhut et al. | Mar. 12, 1929 |
| 1,833,331 | Park | Nov. 24, 1931 |
| 1,979,303 | Woodhouse | Nov. 6, 1934 |
| 2,076,607 | Woodhouse | Apr. 13, 1937 |

FOREIGN PATENTS

| Number | Country | Date |
| --- | --- | --- |
| 350,502 | Great Britain | June 15, 1931 |
| 542,616 | Germany | Jan. 27, 1932 |
| 697,756 | Germany | Oct. 22, 1940 |

OTHER REFERENCES

Ellis: Hydrogenation of Organic Substances, 3rd ed., D. Van Nostrand Co., Inc., 1930, pages 680–5.

Richter's Organic Chemistry, vol. 1, 3rd Eng. ed., (1944), Elsevier Pub. Co. Inc., page 232.

Houben: Die Methoden der Org. Chemie, vol. 2, 3rd ed. (1943), Edwards Bros. Inc., Ann Arbor, Michigan, pages 877–882, 888–891.